US006651063B1

(12) United States Patent
Vorobiev

(10) Patent No.: US 6,651,063 B1
(45) Date of Patent: Nov. 18, 2003

(54) DATA ORGANIZATION AND MANAGEMENT SYSTEM AND METHOD

(76) Inventor: Andrei G. Vorobiev, 639 S. Jackson St., Hinsdale, IL (US) 60531

( * ) Notice: Subject to any disclaimer, the term of this patent is extended or adjusted under 35 U.S.C. 154(b) by 0 days.

(21) Appl. No.: 09/493,911

(22) Filed: Jan. 28, 2000

(51) Int. Cl.[7] .............................................. G06F 17/30
(52) U.S. Cl. ................................ 707/10; 707/3; 707/9; 707/1
(58) Field of Search ............................ 707/1, 3, 10, 9; 705/14, 26

(56) References Cited

U.S. PATENT DOCUMENTS

| | | | |
|---|---|---|---|
| 5,491,820 A | | 2/1996 | Belove et al. |
| 5,559,957 A | | 9/1996 | Balk |
| 5,604,490 A | | 2/1997 | Blakley, III et al. |
| 5,675,507 A | | 10/1997 | Bobo, II |
| 5,798,693 A | | 8/1998 | Engellenner |
| 5,870,549 A | | 2/1999 | Bobo, II |
| 5,964,835 A | | 10/1999 | Fowler et al. |
| 5,979,757 A | | 11/1999 | Tracy et al. |
| 5,995,943 A | | 11/1999 | Bull et al. |
| 6,000,000 A | | 12/1999 | Hawkins et al. |
| 6,052,667 A | * | 4/2000 | Walker et al. ................ 705/15 |
| 6,055,519 A | * | 4/2000 | Kennedy et al. .............. 705/80 |
| 6,108,639 A | * | 8/2000 | Walker et al. ................ 705/26 |
| 6,249,805 B1 | * | 6/2001 | Fleming, III ................. 709/206 |
| 6,308,203 B1 | * | 10/2001 | Itabashi et al. ............... 709/217 |
| 6,393,423 B1 | * | 5/2002 | Goedken et al. .............. 707/10 |

OTHER PUBLICATIONS

"Outlook 2000 Tour," describing Microsoft Outlook 2000® program. Microsoft Outlook is understood to be on sale since 1997. Printed from http://www.microsoft.com/office/outlook/organize.htm.

* cited by examiner

Primary Examiner—Kim Vu
Assistant Examiner—Cam-Y T Truong
(74) Attorney, Agent, or Firm—Marshall, Gerstein & Borun LLP

(57) ABSTRACT

An information storage and management system pre-categorizes information in generic categories to which the information generally pertains, to facilitate organization of information with little or no effort on the part of the recipient. Providers send information to user data repositories associated with unique user destination addresses within the system. Identifiers associated with the information allow the recipient to easily assess the nature of the information and conduct further processing of the information if desired. At least one of the identifiers associated with the information is a category identifier, used to place the information in a location within the user data repository reserved for information in that given identified category. One of the ways in which the recipient can further process the information is to place the information in a custom location according to a custom category location within the user data repository. Such custom categorization can further be communicated to the provider or to a data processing station so that subsequent information from the same provider to the same recipient is automatically placed in the custom category location within the user data repository.

5 Claims, 6 Drawing Sheets

DATA ORGANIZATION AND MANAGEMENT SYSTEM AND METHOD

BACKGROUND

1. Field of the Invention

This invention relates generally to the organization of data and, more specifically, to a computerized system and method allowing providers of information to send information to potentially interested parties in a manner wherein the information is automatically organized by category for the interested parties, wherein the potentially interested parties selectively have some level of control over the placement of the data, and establishing a communication link between providers and recipients for their mutual benefit.

2. Description of the Prior Art

The proliferation of information and communication methods in the technological society in which we live has made it increasingly difficult for businesses and consumers to collect and organize information. Most businesses, as well as most households, whether inhabited by a single individual or an entire family, are constantly inundated with, and some even overwhelmed by, information taking various forms, such as product and service guides and updates, solicitations, mail (U.S., electronic, and voice), and the like. Businesses and consumers habitually store information in places that are not easily accessible, discard information for which they do not have a present use but almost always will have a later use, fail to transmit information to potentially interested third parties, or simply misplace information which cannot easily be reacquired. For example, warranty information or product manuals may be a very low priority to a retailer interested in a quick sale or to a consumer who first purchases and installs a new electronic item such as a stereo, television, video cassette recorder, DVD player, photocopier, telephone, or computer system. However, several days, weeks, or even years later, if the product has been updated, recalled, or malfunctions, or if questions arise as to its usage or compatibility, the warranty information or product manuals can become extremely useful. Unfortunately, many individuals lack a reliable, easy-to-use, centralized information storage system to keep track of such information.

The storage systems many rely upon to keep track of product and service information today generally are obsolete, cumbersome, decentralized and otherwise inefficient. For example, a filing cabinet or storage drawer, figureheads in every home and business, require categorization and re-categorization, are highly dependent on the accuracy of individuals' placement of the information in the correct file, and provide no convenient way for transmission of updates or communications. Also, most computer software systems that provide for the electronic storage of information are frequently cumbersome to initialize, requiring the user to create the separate categories of information, and, further, to place the information in the proper category, and decentralized, requiring the user to maintain several separate computer programs for the maintenance of relevant information. Moreover, most often it is the case that information desired to be stored is not provided to individuals in digital form, but, rather, in paper, card, or booklet form. Some sophisticated users may resort to existing scanning technology to convert their important documents into digital form for storage purposes, but they still must create their own categories of information and place the information into the proper categories.

OBJECTS OF THE INVENTION

It is an object of the present invention to provide an information organization system and method wherein little or no effort is required on the part of a recipient of information in order to store and manage the information in an organized fashion. It is a further object of the present invention for the information organization system and method to have information already categorized, or already designated for association with a particular category, at the time the information is provided to the recipient.

It is a further object of the present invention for the information organization system and method to provide a means for the provider of information to have, in some instances, at least some level of continued access to the information provided to the user so that the provider of information can update the information as may be necessary.

Another object of the present invention is to create a single program by which all information desired to be electronically stored or accessed by users can be maintained and updated to simplify operations and processes.

An additional object of the invention is for the information organization system and method to include, after a recipient receives information from a particular provider, means to instruct the system to facilitate proper designation of further information from the same provider in a fashion desirable to the recipient. Another object of the present invention is to include a means within the system to process a refusal of delivery of information by an intended recipient, and optionally notifying the provider of information in the event a recipient refuses delivery of the information. The manner in which these and other objects of the invention are achieved will become clear through the following Summary of the Invention, the Drawings, and the Detailed Description of the Preferred Embodiments.

SUMMARY OF THE INVENTION

The present invention places the burden on the provider of the information to specify the category to which the information corresponds, so that when the information is provided to the recipient, the information is automatically delivered to a proper location within the recipient's or user's personal information storage and retrieval area, or "User Data Repository." In this disclosure, the words "data" and "information" are considered synonymous and interchangeable. "Recipient" and "User" are also used interchangeably. For purposes of this disclosure of the invention, the following definitions are considered useful:

User Data Repository—Personal information storage and retrieval area, in which information is stored in a compartmentalized or categorized format, allowing the user to easily identify, retrieve, and otherwise manage the information stored in locations corresponding to the various categories therein.

Portal—A collection of User Data Repositories for all Users.

Provider—Any provider of information, such as a seller or distributor of goods or services (e.g., retailer, pharmacist, vendor, supplier, or a physician).

Manufacturer—A source or producer of information about a particular product.

Quarantine Area—An area in or associated with a User Data Repository, in which information is first received by the recipient before passing through a Firewall/Filter.

Firewall/Filter—A barrier that separates the Quarantine Area from a preferably secure or private area of the User Data Repository in which information is stored and managed.

Network—A communications system allowing the transmission of information between Providers and Recipients, e.g., the Internet.

Recipient (or User)—A person (or other entity) that receives information from various Providers.

Reverse Communication Link (or "Feedback")—The transmission of information or data back from a Recipient's User Data Repository to a Provider.

User Destination Address—A protocol, code, or other identifier uniquely associated with each individual Recipient, which is utilized by the Provider for sending information to the intended Recipients via the Network.

Dynamic Information—Information that a Provider or Manufacturer can revise or manipulate subsequent to delivery to Recipients.

Static Information—Information that, to protect the interests of the Recipients, cannot be revised or manipulated by a Provider or Manufacturer after it is sent to Recipients.

In the system and method of the present invention, a Recipient communicates his or her User Destination Address to the Provider. Using this User Destination Address, the Provider sends information to the Recipient's User Data Repository via the Network. The information is encoded, labeled, or tagged by the Provider, via an identification means, with a Provider Identifier that can list such information about the provider as, for example, its name, type of business, street address, phone number, e-mail address or website, and the date of a transaction between the Provider and Recipient, as well as a brief summary of the provided information. This Provider Identifier allows the Recipient to quickly assess the identity of the Provider and/or the nature of the information.

The information is additionally encoded, labeled, or tagged, via a categorization means, as relating to a particular category. The information, carrying both the identifier and the category coding, is transmitted via the Network to a User Data Repository associated with the Recipient's User Destination Address. Preferably, when the information is first received at the User Data Repository, it is stored in the Quarantine Area.

Using the Provider Identifier, the Recipient can then decide whether to allow the information through the Firewall/Filter to a Private Area of the Recipient's User Data Repository, to discard the information, or to keep it in the Quarantine Area. The Quarantine Area has locations to store information corresponding to a generic set of categories. While the Private Area is preferably initially provided with locations to store information corresponding to the same generic categories, the system of the present invention allows the User to modify the categorization of information in the Private Area, and create custom categories in the Private Area, as is explained in greater detail below.

The user can allow the information through the Firewall/Filter by an appropriate authorization means, such as clicking a mouse button, using a keyboard to type an answer to a query on a computer screen, e.g., "Allow? YES or NO", or by using a telephone keypad. Other computer input devices may be used to authorize the information through the Firewall/Filter, such as speech recognition devices. These authorization means are by way of example only.

When the information is placed in the User Data Repository, the information is automatically placed in a location already reserved for information in the category to which the information from the Provider relates, as designated by the Provider using the categorization means. Thus, the Recipient advantageously need not make any effort in categorizing the information or placing the information in an appropriate category.

It is recognized, however, that the user may prefer to place the information in additional or alternate categories to the category initially identified by the Provider. Thus, the present invention allows the user to reassign the information to a different category, or copy the information for storage in one or more additional categories.

Desirably, the system permits the Recipient to refuse to allow information from a particular provider through that Recipient's Firewall/Filter, and simply leave the information in the Recipient's Quarantine Area, or alternatively, instruct the system to discard or delete the information. At the Recipient's option, the system can be configured so that an instruction to the system to discard or delete information from a particular Provider is preserved by the system, and the system prevents all future information from that Provider from even reaching the Recipient's Quarantine Area. In this manner, the Recipient does not receive any further information from that Provider whose information has been refused. This configuration is preferably reversible, so that the Recipient can later elect to again be able to receive information from that Provider.

The present invention may also utilize Feedback means, if desired by the Recipient, to relay back to the Provider specifics as to the reassignment or additional categorization of information performed by the Recipient, so that subsequent information sent to the same Recipient using the same User Destination Address will be properly categorized in the Recipient's User Data Repository according to the Recipient's customized categorization system. Advantageously, by relaying back to the Provider, via Feedback means, such specifics as to any reassignment or additional categorization performed by the Recipient, the Provider can reliably supplement the information originally sent to the Recipient if necessary, and the recipient can be assured that all copies of the Information stored in the private or secure area of his or her User Data Repository are updated with the appropriate supplement.

More preferably, the system of the present invention can be configured so that the specifics as to the reassignment or additional categorization of information performed by the Recipient pertaining to information from each particular Provider is relayed to a data storage and processing unit within the system, but remote from the Providers. Most preferably, this data storage and processing unit is associated directly with the Recipient's Firewall/Filter. In this manner, all subsequent information transmitted from the Providers can still be properly categorized in each Recipients' User Data Repository according to the individual Recipient's customized categorization system, by first passing through the data storage and processing unit. Advantageously, the information is correctly categorized in each Recipient's User Data Repository without informing the Provider as to any information as to the Recipients' further processing of the information, and without the Provider having to update its own records for each Recipient to whom it sends information.

It is recognized that one possible form of the information provided to the Recipient may be a link to, for example, a specific page or area of an Internet website, with or without interactive features, controlled by the Provider or by a Manufacturer. This is one example of Dynamic Information a Provider or Manufacturer may furnish to Recipients. In this manner, the storage requirements for each Recipient's User Data Repository are relatively small and the Provider or Manufacturer is able to update information for all Recipients by simply updating the website within its own control, rather than having to notify each Recipient of a particular update.

Alternatively, the information may more desirably be Static Information—that is, to protect the interests of the recipients, the information can be delivered to the Recipient's User Data Repository in a manner which prevents later revision by the Provider or Manufacturer, i.e. so as to preserve the original text of the information. If further desired, such Static Information may be accompanied by a link for the Recipients to locate Dynamic Information from the Provider or Manufacturer, such as updates or supplements.

DETAILED DESCRIPTION OF THE PREFERRED EMBODIMENTS

In a preferred embodiment of the information storage and management system 10 of the present invention, a Recipient 12, such as a customer (which customer can be either private, or commercial), of a retailer, distributor, wholesaler, dealer, or manufacturer, or a patient of a physician, supplies a Provider 14 with the Recipient's User Destination Address via some communication means. The User Destination Address can be provided at any mutually convenient time, such as at the time of purchase, or upon check-in, or at any other time as may become the standard accepted practice or custom in a particular setting. The means of communicating the User Destination Address to the Provider 14 can take various forms, including the Recipient 12 simply orally telling the Provider 14 his or her User Destination Address, e-mailing the Provider 14 his or her User Destination Address, having the User Destination Address encoded onto a bar code that is placed on a card carried by the Recipient 12 and read by the Provider's computer using a bar code reader as an input device, having the User Destination Address encoded directly into the magnetic strip of the Recipient's credit card or debit card, so that the User Destination Address is automatically communicated to the Provider's computer at the time of purchase, having the User Destination Address be the same as the Recipient's unique credit card number so that it can be transmitted during telephone or on-line purchases, portable computers interlinked with other computers (as described in U.S. Pat. No. 6,000,000) or by transmitting the User Destination Address via wireless means, such as via a personal organizer, portable computer, or portable telephone carried by the Recipient 12 with the capability of remotely transmitting data, such as by radio waves, analog or digital cellular means, or infrared light, to a reader associated with the Provider's computer. These various means of communicating the User Destination Address to the Provider 14 are intended to be exemplary, and not exclusive.

Figure 1:
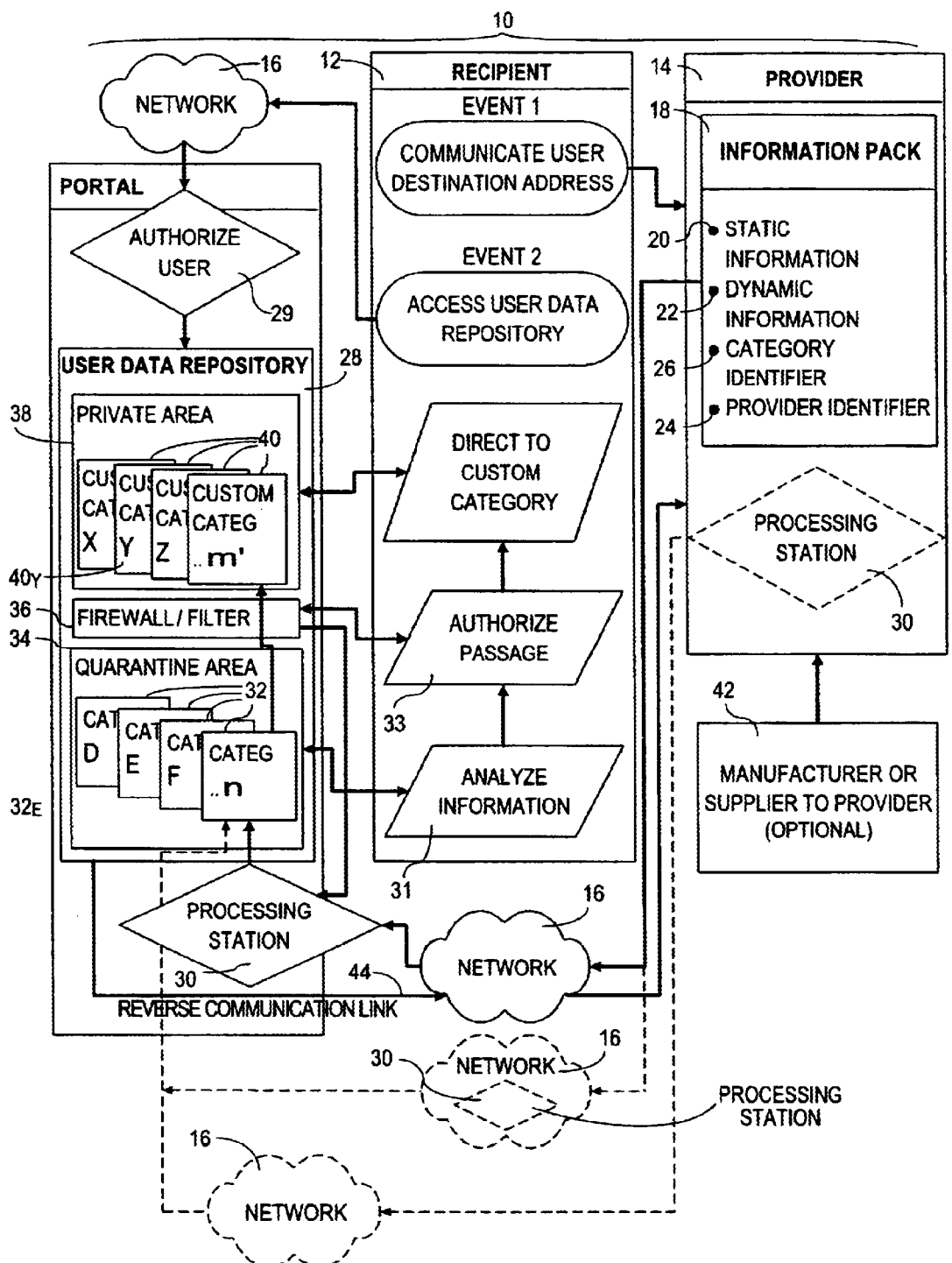
FIG. 1 is a schematic diagram of possible configurations of a preferred embodiment of the data organization and management system of the present invention.

Referring to FIG. 1, the system 10 utilizes a Network 16, such as the Internet, for communicating information from the Provider to the Recipient. The User Destination Address may be an e-mail address, or some other identifier uniquely associated with the particular Recipient.

The Provider 14 sends information to the desired Recipient's User Destination Address in an Information Pack 18, consisting of Static Information 20 and/or Dynamic Information 22, a First Identifier 24, also called a Provider Identifier 24, used to identify the Provider 14 of the information contained in the Information Pack 18, and a Category Identifier 26 used to identify a generic category to which the information contained in the Information Pack 18 pertains. The system also includes address means for the Provider 14 to connect or associate the desired User Destination Address with the Information Pack 18. The system further includes means for the Provider 14 to associate the Provider Identifier 24 with the Information Pack 18. Alternatively the system may include means for automatically associating the Provider Identifier 24 with any Information Pack 18 coming from a given Provider 14, such as recognition means that allows the system to recognize each Provider 14, and in response to any Provider 14 sending an Information Pack 18, the recognition means associates the appropriate Provider Identifier 24 with the Information Pack 18.

At some point before, during, or after passing through the Network 16, with these various alternate configurations being represented by broken lines in FIG. 1, the Information Pack 18 preferably passes first through a Processing Station 30, where any or all of the User Destination Address, Provider Identifier 24, and the Category Identifier 26 associated with the Information Pack 18 can be analyzed.

The Information Pack 18 is delivered to the intended Recipient's User Data Repository 28 by reading the User Destination Address associated with the Information Pack 18, and delivering the Information Pack 18 to the appropriate User Data Repository 28 associated with that particular User Destination Address. Such reading of the User Destination Address can be performed at the Processing Station 30, which preferably has its own data storage means and data processing means for analyzing the User Destination Address associated with any given Information Pack 18 and matching it to the proper corresponding User Data Repository 28.

In addition to reading the User Destination Address, the present invention advantageously includes means for reading the Category Identifier 26 associated with a given Information Pack 18, and for automatically placing at least the Static Information 20 and/or Dynamic Information 22 stored inside the Information Pack 18 in a location of the User Data Repository 28 that is reserved for information in the category to which the Static Information 20 and/or Dynamic Information 22 pertains, as identified by the Category Identifier 26.

Preferably, there are a plurality of generic categories, namely "Category D", "Category E", . . . , "Category n", used in the system of the present invention. Locations 32 in each Recipient's User Data Repository 28 are initially reserved for each of these generic categories. Alternatively, to save to accommodate future generic categories, to avoid the need for Recipients to look in multiple empty categories for information, and for other considerations that are understood by those of ordinary skill in the art, the system can be configured to only create a location 32 in a given Recipient's User Data Repository 28 for a particular category, "Category E" for example, when an Information Pack 18 is first delivered to that User Data Repository 28 with information pertaining to that category. In other words, once an Information Pack 18 is delivered to that User Data Repository 28 with a Category Identifier 26 indicating "Category E", a location $32_E$ is created within the User Data Repository 28 for information pertaining to "Category E".

When an Information Pack 18 is received in the User Data Repository 28, the Information is preferably in a Quarantine Area 34 of the User Data Repository 28. It is recognized that the Information Pack 18 may be placed in the appropriate location within the User Data Repository 28 corresponding to the Category Identifier 26 either when the Information Pack 18 is first delivered to the User Data Repository 28, or alternatively, after the Recipient 12 has authorized the information to pass through the Firewall/Filter 36. Recipient 12 preferably has the ability to further process the information stored in the Information Pack 18. First, the Recipient 21 has the ability to analyze the Provider Identifier 24 and decide whether the Information Pack 18 should be accepted or refused.

Another example of the Recipient's ability to further process the information stored in the Information Pack 18 is the ability to forward the Information Pack 18, or portions of the information stored therein, to the User Destination Addresses of other Recipients. For example, a purchaser of a gift may receive in his or her User Data Repository 28 an Information Pack 18 from a Provider 14 which is a retailer that sold him or her the gift, the Information Pack 18 including warranty information about the gift. Although that purchaser is a Recipient 12, the person for whom the gift was purchased should have the warranty information. Thus, the system of the present invention advantageously allows the purchaser to forward the Information Pack 18 to the User Data Repository 28 associated with a User Destination Address of the person for whom he or she purchased the gift. Alternatively, it is recognized that the Recipient 12 could e-mail the Information Pack 18, or at least some contents thereof (such as Dynamic Information 22 and Provider Identifier 24 only, so that the Recipient does not see static information 20 that would include the price of the gift) to the person to whom the gift is given.

Turning back to the first processing means available to a Recipient 12, a refusal to allow the Information Pack 18 is either sent to the Provider, or more preferably, to the Processing Station 30. The system can be configured so that a refusal by a particular intended Recipient 12 to allow a single Information Pack 18 from a particular Provider 14 will establish a block, preventing all future Information Packs 18 from being sent by that Provider 14 to that Recipient 12, until the Recipient 12 sends instructions to remove the block. One manner in which such a block could operate is as follows: Upon delivery of a given Information Pack 18 from a given Provider 14 to the User Data Repository of a particular Recipient 12, the Recipient 12 has an opportunity to review at least minimal descriptive information about the Information Pack 18 to facilitate the Recipient 12 in deciding whether to allow or refuse the Information Pack 18.

The Provider Identifier 24 associated with the Information Pack 18 may be sufficient, but the Recipient 12 may, if desired, also be permitted to review additional information associated with the Information Pack 18, such as the Category Identifier 26. Additional identifiers (not shown), such as a short title, may be placed in the Information Pack 18 by the Provider to further assist the Recipient 12 in readily determining the nature of the substantive information included in the Information Pack 18. In the event the Recipient 12 refuses to accept the Information Pack 18, the Information Pack 18 is deleted or removed from the Recipient's User Data Repository.

If the system is configured to block the Recipient from receiving any future Information Packs from a Provider 14 upon the Recipient's refusal of an Information Pack 18 from that Provider, such refusal is echoed back, with the Provider Identifier 24, either to the Provider (for example via a reverse communication link 44, discussed in greater detail below) or more preferably, to a data storage and processing location remote from the Provider, such as the Processing Station 30. If the location to which the refusal is echoed is remote from the Recipient's User Data Repository 28, then the Recipient's User Destination Address is also echoed back with the refusal and the Provider Identifier 24. Thus, such a Processing Station 30 could centrally store refusal information for all Recipients as to all Providers.

Alternatively, the refusal information can be stored locally for each Recipient, such as in an Analyze Information step 31, where a record is stored of refusals of any Providers in association with each Recipient's User Data Repository, and an Authorize Passage step 33 can allow an Information Pack 33 into the User Data Repository 28, or even through the Firewall/Filter 36, in accordance with the Recipient's instructions (it is recognized that the Analyze Information step 31 and Authorize Passage step 33 can occur in the Processing Station 30). This would eliminate the need for sending the User Destination Address back from the User Data Repository, and lowers risk that a memory loss at the Processing Station 30 would detrimentally globally effect the future operation of the system.

Regardless of where the refusal information is stored, i.e. whether in association with the Provider, in association with the Recipient's User Data Repository, at the Processing Station 30, or somewhere in between, a block can then be established. Upon any subsequent attempt by the Provider 14 to send an Information Pack 18 to that Recipient 12 using the Recipient's User Destination Address, an authorization means analyzes the Provider Identifier 24 and/or the User Destination Address associated with the Information Pack 18 to determine whether any information from that Provider 14 has previously been refused by that Recipient 12, and if so, the Information Pack 18 is prevented from being delivered to the Recipient's User Data Repository 28. Preferably, the Recipient should have the ability to instruct the system to remove the block from a particular Provider, if desired.

In the event the Recipient 12 does not refuse to accept the Information Pack 18, the Recipient 21 may selectively allow the Information Pack 18, or any portion of the information in the Information Pack 18, to pass through the Firewall/Filter 36, into a Private Area 38 of the Recipient's User Data Repository 28. The Private Area 38 can be protected by conventional protection means, such as passwords or encryption, to avoid tampering with any information contained therein. Advanced data processing features permit the Recipient 12 to further manipulate the placement of the information in the Information Pack 18, if desired. For example, once the Information Pack 18 is allowed through the Firewall/Filter 36, the Recipient may re-assign the Information Pack 18 to a different generic category, or to a custom category. It is recognized that the custom categorization may also take place in the Quarantine Area 34.

A plurality of custom category locations 40 in the Recipient's User Data Repository 28 are reserved for each of the custom categories, namely "Custom Category X", "Custom Category Y", . . . , "Custom Category m'". If desired, these custom categories could be further broken down by subcategories (not shown). As with the locations 32, the system can be configured to only create a custom location 40 in a given Recipient's User Data Repository 28 for a particular custom category, "Category Y" for example, when an Information Pack 18 is reassigned by the Recipient 12 to a new custom category, i.e. when a Recipient first reassigns an Information Pack 18 to "Custom Category Y", a custom location $40_Y$ is created within the User Data Repository 28 for information pertaining to "Custom Category Y".

The present invention advantageously allows for the Recipient's custom categorization of the Information Pack 18 to be communicated, with the User Destination Address, either by Feedback means to the Provider 14, or by echo means to the Processing Station 30. If the custom categorization is communicated by echo means to the Processing Station 30, then in addition to the Recipient's custom categorization and User Destination Address, the Provider Identifier is also sent to the Processing Station 30. The user 12 preferably accesses his or her User Data Repository 28 via a network 16, such as the Internet or an intranet, and preferably an authorization step 29 must be satisfied before the user 12 can access the contents of the User Data Repository 28.

All subsequent Information Packs 18 from the same Provider 14 to that Recipient 12 can then advantageously be automatically delivered directly to the proper custom category, by scanning the Information Pack 18 to determine whether the intended recipient has created custom categorization for an Information Pack 18 from that Provider 14 on a previous occasion, and if so, modifying the Category Identifier 24 or adding an additional Custom Category Identifier (not shown) to the Information Pack 18 before placement into the Recipient's User Destination Repository 28, to instruct the system as to where the Information Pack 18 is to be automatically placed in the User Data Repository 28. Just as with the block discussed above, the custom categorization of a given Information Pack 18 can instead echo a Custom Category Identifier and the Provider Identifier 24 to a storage and processing area closely associated with the User Data Repository, so that the User Destination Address need not be communicated to the Provider 14 or the Processing Station 30.

The custom locations 40 may be located in the Private Area 38 of the Recipient's User Data Repository 28, or in an area of the User Data Repository 28 not protected by the Firewall/Filter 36. While the Quarantine Area 34, Firewall/Filter 36, and Private Area 38 are considered to be desirable features, they are not necessary in all embodiments of the inventive system and method.

One form of information within an Information Pack 18 can be a link to an Internet address. The Provider then has the ability to modify or update the content of information that may be of importance to its Recipients without having to send each Recipient the entire information. In this sense, the information provided to each Recipient is considered Dynamic Information 22, even though the actual link or Internet address does not change, because the Provider has the ability to manipulate the content of the information being provided to the Recipient.

In the inventor's preferred embodiment, all Providers would be registered with a centralized authority, agency, or company before having the ability to utilize the system to send information to intended Recipients. This centralized overseer would prevent abuses, and the registration requirement would advantageously provide some level of quality assurance to Recipients 12. The registration process can be straightforward, and could be performed at any time prior to sending of an Information Pack 18. However, depending on the manner in which the User Destination Address is communicated by the Recipient 12 to the Provider 14, it may take some time to equip the Provider 14 with means to read the User Destination Address, as well as with means to create an Information Pack 18 (such as loading appropriate software on the Provider's computer system). In a preferred embodiment, when the Information Pack 18 passes through the Processing Station 30 prior to delivery to any User Data Repository 28, the Processing Station verifies that the Provider 14 is an authorized, properly registered provider, and verifies that the Information Pack 18 is properly formatted in accordance with the parameters of the system.

It is recognized that it will often be desirable to send information to Users that is not generated by the Providers 14, such as retailers or service providers, but rather, is generated by, for example, the original source of the goods such as a Manufacturer 42 of a television or automobile. Thus, the First Identifier 24 may identify a Manufacturer 42 or other source of information as opposed to, or in addition to, the Provider 14, or one or more additional or alternate identifiers (not shown) may be associated with the Information Pack 18 to identify these alternate sources of information.

An advantageous feature of the system and method of the present invention is the reverse communication link 44, which can lead back to the Provider 14, or even to alternate sources of information. Instead of requiring the Recipient 12 to generate his or her own Information Pack 18, and send it to a User Destination Address associated with a given Provider 14, the system and method preferably automatically establishes a reverse communication link 44 once the Information Pack 18 is delivered to the User Data Repository 28. The reverse communication link 44 can be used for such purposes as confirming receipt of the Information Pack 18, requesting additional information of the provider, sending details to the provider concerning a block or a custom category 40 assigned to the Information Pack 18, or sending periodic updates to the Provider 14 concerning the products purchased by the recipient 12, to name just a few. Another advantageous use of the reverse communication link 44 is to automatically communicate back to the provider 14 certain information residing in, or accessible from, the recipient's User Data Repository 28, which can be used to provide better service, improved quality, or continued maintenance to the recipient. This is sometimes referred to in the art as "pull" technology, whereas the sending of information to recipients is sometimes referred to in the art as "push" technology. If desired by the Recipient 12, the system and method of the present invention can be configured so that some or all the static information 20 associated with all prior information packs 18 stored in a given category location 32 within the Quarantine Area 34 of the Recipient's User Data Repository 28 may be communicated via the reverse communication link 44 back to the Provider 14.

Preferably, an authorized provider 14 has access only to one specific custom category location 32 within the Quarantine Area 34 of the User Data Repository 28 in a push information scenario. While it is recognized that it may be desirable in certain applications to grant a provider 14 access to one or more locations 40 in the Private Area 38, it is generally preferable that if a user authorizes a provider to pull information from a certain location within the User Data Repository 28, then the information to be communicated to the provider is already located in, or first moved to, the Quarantine Area 34.

The benefits and manner of operation of the system and method of the present invention are demonstrated in greater detail in the following examples. In each of the examples, corresponding elements and steps are enumerated with corresponding reference numbers, increased by a factor of one-hundred.

EXAMPLE 1

Figure 2:
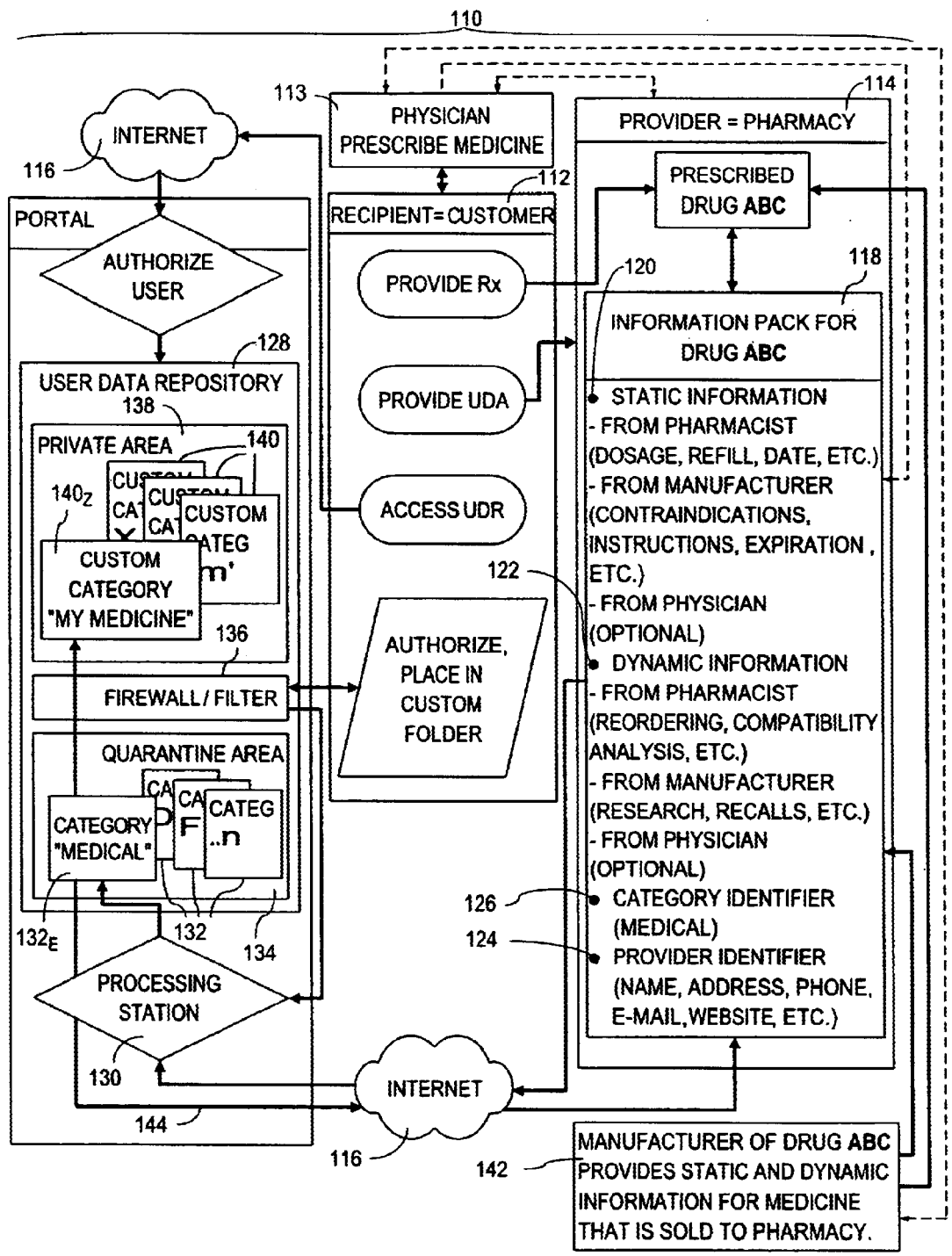
FIG. 2 is a schematic diagram of an example of the system and method of the present invention demonstrating its use in the organization and management of prescription drug information from a drug manufacturer, a physician, and a pharmacy.

Turning to FIG. 2, the system and method of the present invention works well in the dissemination and control of information concerning prescription drugs. The manufacturer 142 of a particular drug, say "Drug ABC", provides information about the drug to a pharmacy 114 at or near the time of a purchase by that pharmacy 114 of some quantity of Drug ABC. It is recognized that there may be intermediate steps between the manufacturer 142 and the pharmacy 114, but for simplification of the example, it is assumed that the drugs are sold directly by the manufacturer to the pharmacy for sale to the general public, in a manner consistent with laws governing dispensing of pharmaceuticals.

The pharmacy 114 generates an Information Pack 118 containing Static Information 120, such as the name of the medication, expiration dates, and size of the tablets, and Dynamic Information 122 from the manufacturer 142 about the drug, such as contraindications (i.e., drug compatibility), warnings concerning activities that should be avoided after taking the medication, and instructions for storage of the drugs. The Information Pack 118 may also have a Provider Identifier 124 indicating the name of the pharmacy 114 and, if desired, the name of the manufacturer 142 of the drug, as well as generic Category Identifier 126, such as "Medical". It is recognized that the Information Pack 118 could instead have originated at the manufacturer 142, with the pharmacy 114 having the ability to supplement or modify the Information Pack 118 with its own information.

When the pharmacy 114 fills a prescription provided by a physician 113, the physician's name, dosage instructions, and refill allowances may be added by the pharmacy as further Static Information to the Information Pack 118. Preferably, the pharmacist's software concerning prescriptions, dosages, and the like is integrated with the means for generating or modifying the Information Pack 118, such that the information provided in the physician's prescription can be automatically stored in the Information Pack 118 as Static Information 120 automatically while the pharmacist fills the prescription and makes the appropriate labels for the pill bottles. The Information Pack 118 is also provided with a generic Category Identifier 126, such as "Medical."

At the time of purchase, the customer 112 provides the pharmacy 114 with the customer's user destination address, which may be encoded on the magnetic strip of the customer's credit card, or provided on the customer's health insurance card provided to the pharmacy. Notably, if the physician 113 also has the ability to send information to the pharmacy 114 through the system, the prescription itself may be transmitted in the form of an Information Pack 118 from the physician 113 to the pharmacy 114, with certain Static Information 120 already associated with the Information Pack 118 provided to the pharmacy 114, and the patient's user destination address could even already be associated with the Information Pack 118 sent by the physician 113 to the pharmacy 114.

The Information Pack 118 generated by the pharmacy 114 could therefore be a combination of separate Information Packs received from the physician and from the drug manufacturer. This type of situation, in which multiple providers contribute to a single Information Pack, is described in more detail in Example 3. Various other possibilities are also recognized, such as the drug manufacturer sending information packs to physicians instead of pharmacists, and the physicians in turn provide the Information Pack to the pharmacist with the prescription for forwarding to the patient, or alternatively, the physician can forward the information pack directly to the patient.

When the pharmacy 114 transmits the Information Pack 118 to the user destination address, the Information Pack 118 travels over a network such as the Internet 116. The Information Pack 118 is analyzed at a processing station 130 to determine whether the Information Pack 118 is authorized by reviewing the Provider Identifier 124 and the user destination address to which the Information Pack 118 is being sent. The Category Identifier 126 "Medical" can also be analyzed by the processing station 130, so that when the Information Pack 118 is placed in the User Data Repository 128 associated with the customer's user destination address, the Information Pack 118 is placed in a particular location $132_E$ of the User Data Repository reserved for medical information.

As shown in FIG. 2, the Information Pack 118 is first delivered to a Quarantine Area 132 of the User Data Repository 128, from which the customer 112 can, upon accessing his or her user data repository 128, further process the Information Pack 118 by, for example, allowing the Information Pack 118 to pass through a Firewall/Filter 136 of the User Data Repository. If desired, the customer 112 can create a custom category location $140_Z$ in his or her Private Area 138 of the User Data Repository 128 for the Information Pack 118, such as "My Medicine". This can be particularly advantageous for families who may share a single User Destination Address, but can still have custom categories 140 of information for particular family members.

Advantageously, the system 110 can be configured such that the placement of an Information Pack 118 in a Custom Category location $140_Z$ sends a signal to the processing station 130 to direct further Information Packs to that same Custom Category location $140_Z$, as opposed to a generic category location 132. It is recognized that the Provider Identifier 124 may be insufficient for the system to automatically accurately determine into which custom category location a new Information Pack from the same pharmacy 114 should be placed. For example, while a first Information Pack 118 from the pharmacy 114 may be placed in Custom Category location $140_Z$ "My Medicine", a subsequent Information Pack from the pharmacy 114 may be intended for another household family member who shares the same user destination address. This problem can be overcome by using multiple data fields to decide whether an Information Pack is to be directed to a Custom Category, such as an Original Provider Identifier (not shown) which could identify the physician 113, and another Provider Identifier 124 which would identify the pharmacy 114, assuming none of the family members share both the same physicians and pharmacies.

One of the advantageous components of the system 110 is the option to configure the system so that the successful delivery of an Information Pack 118 to a customer's User Data Repository 128 results in a reverse communication link 144 back to the pharmacy 114. As shown in FIG. 2, the reverse communication link 144 may be directly from a category location $132_E$ within the user's quarantine area. As such, the system 110 can automatically, upon delivery of the Information Pack 118 concerning Drug ABC, communicate all, or at least authorized portions of, the contents of the customer's category location $132_E$ entitled "Medicine" back to the pharmacy. Because people may change pharmacies from time-to-time, it cannot always be assumed that the pharmacy's computer system will have all the data concerning a customer's prior prescriptions to accurately detect a drug incompatibility problem.

Advantageously, the reverse communication link 144 can facilitate the automatic transmission of static information 120 such as the names and dosages of all medicines already prescribed to the customer 112 (provided all other prescribed medications the customer 112 is taking were also similarly accompanied by information packs previously delivered to the customer's custom category location $132_E$ of his or her User Data Repository 128, even if purchased from different pharmacies). This static information can be used to screen for contraindications, i.e. to verify drug compatibility for the particular patient, and if any incompatibilities are found, the customer can be notified by the pharmacy. Depending on the speed of the system 110, such verification and, if necessary, notification of drug incompatibility can take place even before the customer 112 leaves the pharmacy 114.

Preferably, this reverse communication link 144 would only send information back to the pharmacy 114 from category locations 132 in the Quarantine Area 134 of the User Data Repository 128, to protect the privacy of the customer 112, unless otherwise instructed by the customer 112. The customer 112 in certain instances may prefer that the system 110 be configured such that the reverse communication link 144 sends information back to the pharmacy 114 from one or more Custom Category locations 140 in the Private Area 138, instead of from the category locations $132_E$ in the Quarantine Area 134, such as if medications for different family members are placed in different custom category locations 140.

EXAMPLE 2

Figure 3:
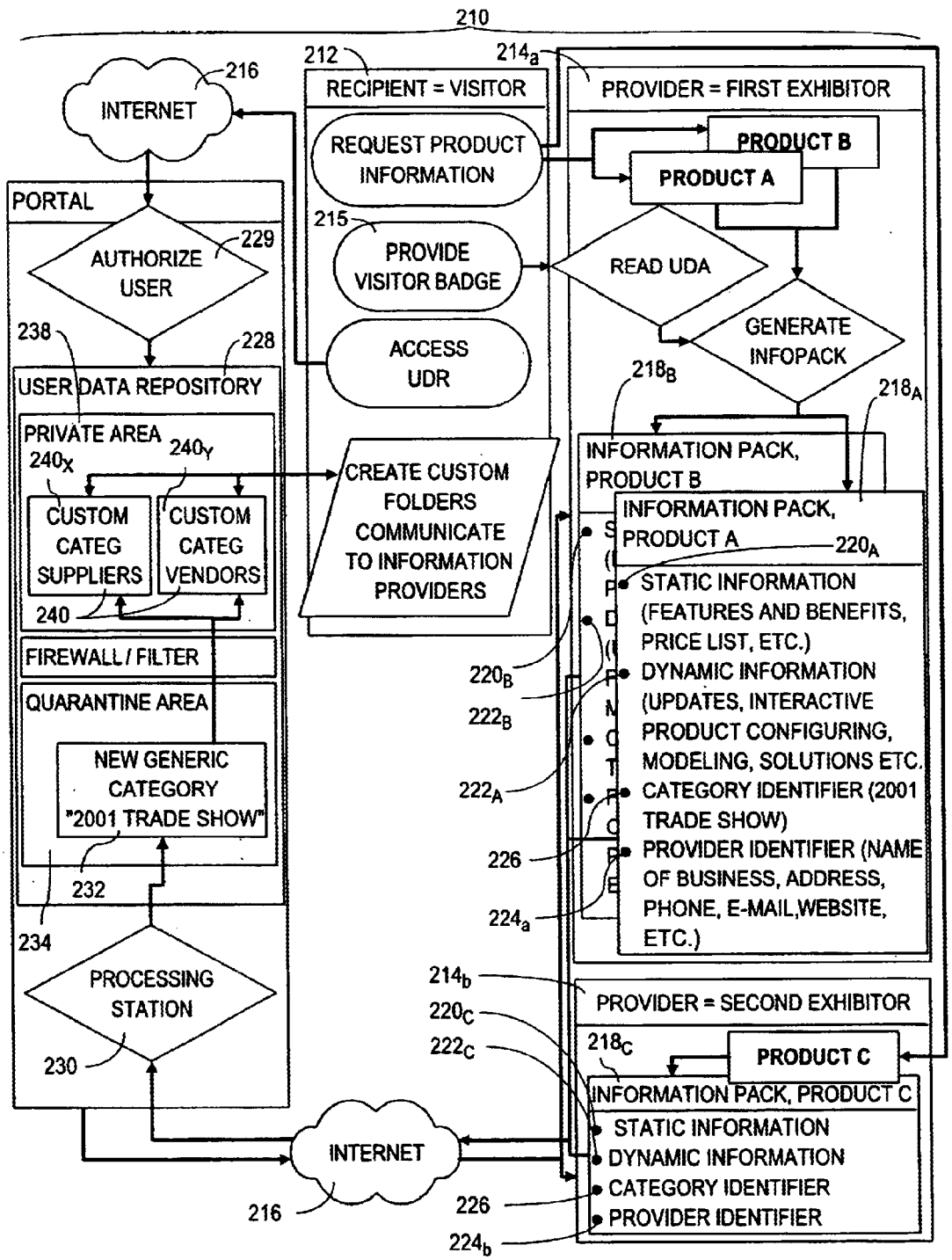
FIG. 3 is a schematic diagram of an example of the system and method of the present invention demonstrating its use in the organization and management of information about various products from multiple exhibitors at a trade show.

Another example demonstrating the advantages of the present invention is shown in FIG. 3. When business people attend trade shows, they are often inundated with such information as business cards and literature about the exhibitors and products displayed at the show. By the time the visitors return home, they may have lost the information, or simply forgotten which products were presented by particular exhibitors. As shown in FIG. 3, the system and method of the present invention facilitate an orderly, organized way to provide information to the visitor 212, with the benefits of reduced paper, and reliable storage so that the visitor 212 can later locate the information in his or her own User Data Repository 228.

Upon visiting an exhibitor, namely First Exhibitor 214a, at a trade show, the visitor 212 may request information about one or more particular products on display at that exhibitor's booth, say Products A and B. The visitor 212 can communicate his or her user destination address by any appropriate manner, such as having the user destination address encoded on a bar code on the visitor badge 213 and providing the First Exhibitor $214_a$ with the opportunity to scan the user destination address encoded on the visitor badge 215 using a bar code reader. The First Exhibitor $214_a$ can generate an Information Pack $218_A$, $218_B$ for each of the products in which the visitor 212 expresses an interest, e.g. Product A and Product B.

The Information Packs $218_A$, $218_B$ include Static Information $220_A$, $220_B$, such as a description of features and benefits of the product, a price list, and a name of the salesperson with whom the visitor may have spoken at the trade show. Dynamic Information $222_A$, $222_B$ may also be provided, such as information regarding latest updates, interactive product configurations, modeling, particular solutions that may have been discussed to tailor the product to the needs of the visitor 212 or his or her company, and the like. A Provider Identifier $224_a$ is also placed in association with each of the Information Packs $218_A$, $218_B$.

The Information Packs are transmitted to the User Data Repository 228 associated with the Visitor's User Destination Address provided on the visitor badge 215 by means of a network such as the Internet 216. When the Information Packs $218_A$, $218_B$ are delivered to the User Data Repository 228 associated with the Visitor's User Destination Address, a processing station 230 reviews the Category Identifier 226 and places the Information Packs $218_{A, 218B}$ in a corresponding location 232 within the Quarantine Area 234 of the User Data Repository 228.

The Category Identifier 226 relates to a generic category, e.g. an industry to which Products A and B relate. It is recognized that at the trade show, all exhibitors can be instructed to provide a common category identifier in association with any information packs sent by any of the exhibitors based on contacts initiated at the trade show. In this manner, the processing station 230 associated with each visitor's User Data Repository 228 can be configured such that, even if a corresponding location 232 did not already exist in the User Data Repository 228, upon the delivery of a first Information Pack $218_A$ from any of the exhibitors, a new generic category location 232 is created in the visitor's Quarantine Area 234. The existence of the same Category Identifier 226 in any subsequent information packs sent from any exhibitors at the trade show to the User Data Repository 228 of the same Visitor 212 result in those information packs, if authorized by the visitor 212, being automatically placed in the same category location 232.

Advantageously, the visitor 212 can preferably access his or her User Data Repository 228 remotely, via the Internet 216, so he or she can create any desired custom category locations 240 in the Private Area 238 of his or her User Data Repository 228 without even leaving the trade show.

Further, the same visitor 212 may request product information from a Second Exhibitor $214_b$ at the same trade show. In order for the Second Exhibitor $214_b$ to provide an Information Pack $218_c$ about its Product C, the Second Exhibitor $214_b$ reads the User Destination Address from the visitor badge 215 of the visitor 212 in the same manner as the First Exhibitor $214_a$, e.g. using a bar code reader. The Second Exhibitor $214_b$ generates an Information Pack $218_c$ for Product C, which contains appropriate Static Information $220_c$, Dynamic Information $222_c$, a Category Identifier 226 and a Provider Identifier $224_b$.

The Information Pack $218_c$ is transmitted to the same User Destination Address 228 of the visitor 212 by the Internet, and the processing station 230 reviews certain of the items associated with the Information Pack $218_c$, such as the Provider Identifier $224_b$ to see if it is an authorized provider, and the Category Identifier 226. So long as there is not a block preventing information from the Second Exhibitor $214_b$ from entering the visitor's User Data Repository 228 (and it is recognized that a similar authorization procedure can occur for the Information Packs $218_A$, $218_B$ from the First Exhibitor 214a), the Information Pack $218_c$ is placed in the appropriate location 232 in the Quarantine Area 234 of the User Data Repository 228.

As explained above, the visitor 212 can have access to his or her own user data repository 228 through various means, such as the Internet 216. A verification means 229 may be provided in order for the user to gain authorization to access his or her user data repository, such as password identification. Once the visitor 212 gains access to his or her user data repository 228, he or she can perform various tasks with the Information Packs $218_A$, $218_B$, $218_C$, such as authorize one or more of them to pass through a firewall/filter 236 to a Private Area 238 of the user data repository 228, and forward copies of the Information Packs $218_A$, $218_B$, $218_C$ to user data repositories of others, such as co-workers.

Another important function the visitor 212 can perform is creating one or more custom categories 240 for one or more of the Information Packs $218_A$, $218_B$, $218_C$. The visitor 212 can create a custom category location $240_X$ entitled "Suppliers" for all the Information Packs $218_A$, $218_B$, received from any of the exhibitors at the trade show who deal in, for example, components or parts in which the Visitor 212 expresses an interest, and another custom category location $240_Y$ entitled "Vendors" for other Information Packs 218 received from exhibitors who deal in, for example, raw materials in which the Visitor 212 expresses an interest.

The system 210 can advantageously be configured to send a signal upon the placement in the custom category location 240 of any of the Information Packs $218_A$, $218_B$, $218_C$ to the Processing Station 230, so that all subsequent information packs from those same providers, namely First Exhibitor $214_a$ or Second Exhibitor $214_b$, will automatically be authorized to pass through the Firewall/Filter 236 of the User Data Repository 228, and be placed in the appropriate custom category location 240.

EXAMPLE 3

Figure 4:
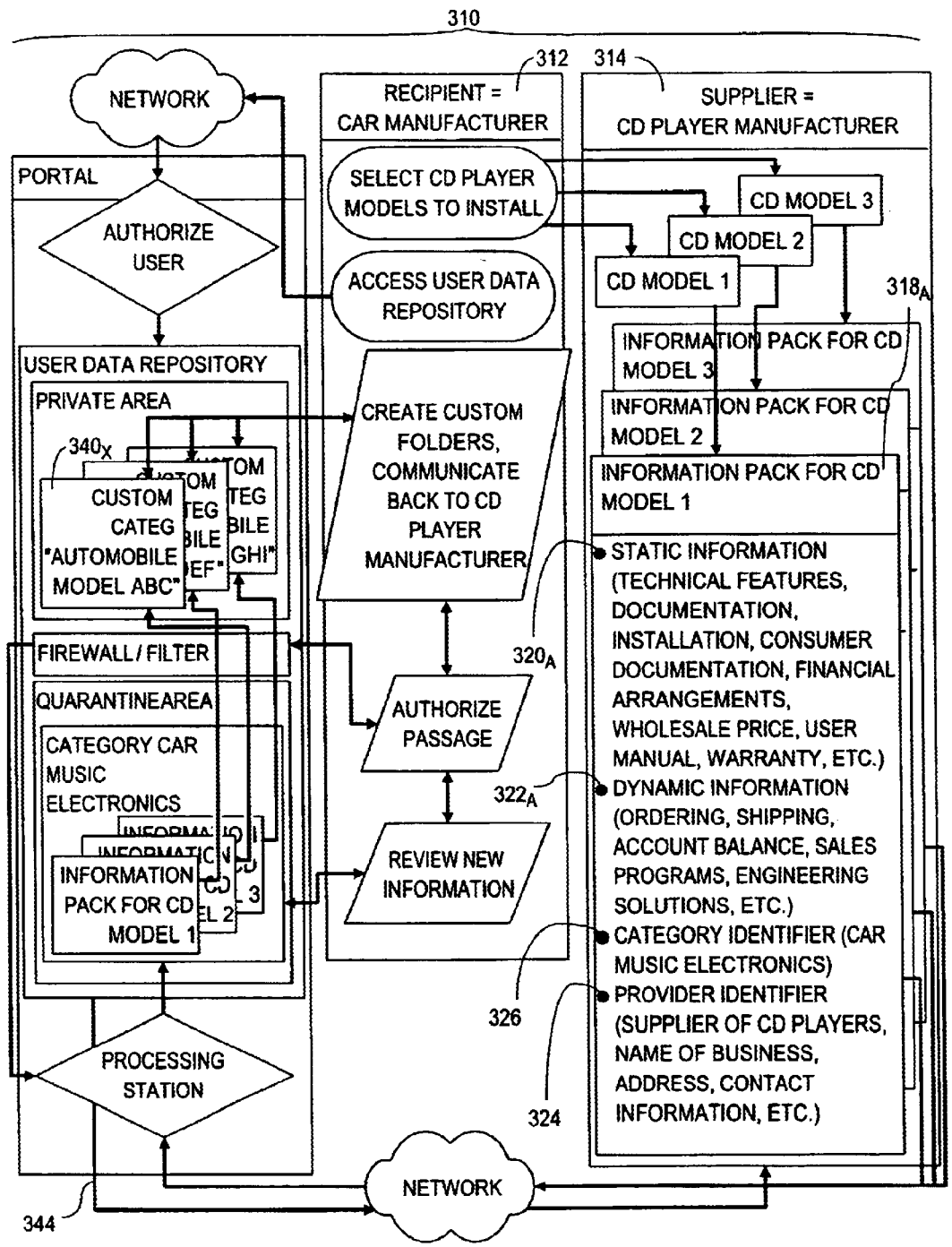
FIG. 4 is a schematic diagram of an example of the system and method of the present invention demonstrating its use in a business-to-business application, for the organization and management of information about various models of compact disk players supplied to an automobile manufacturer.
Figure 5:
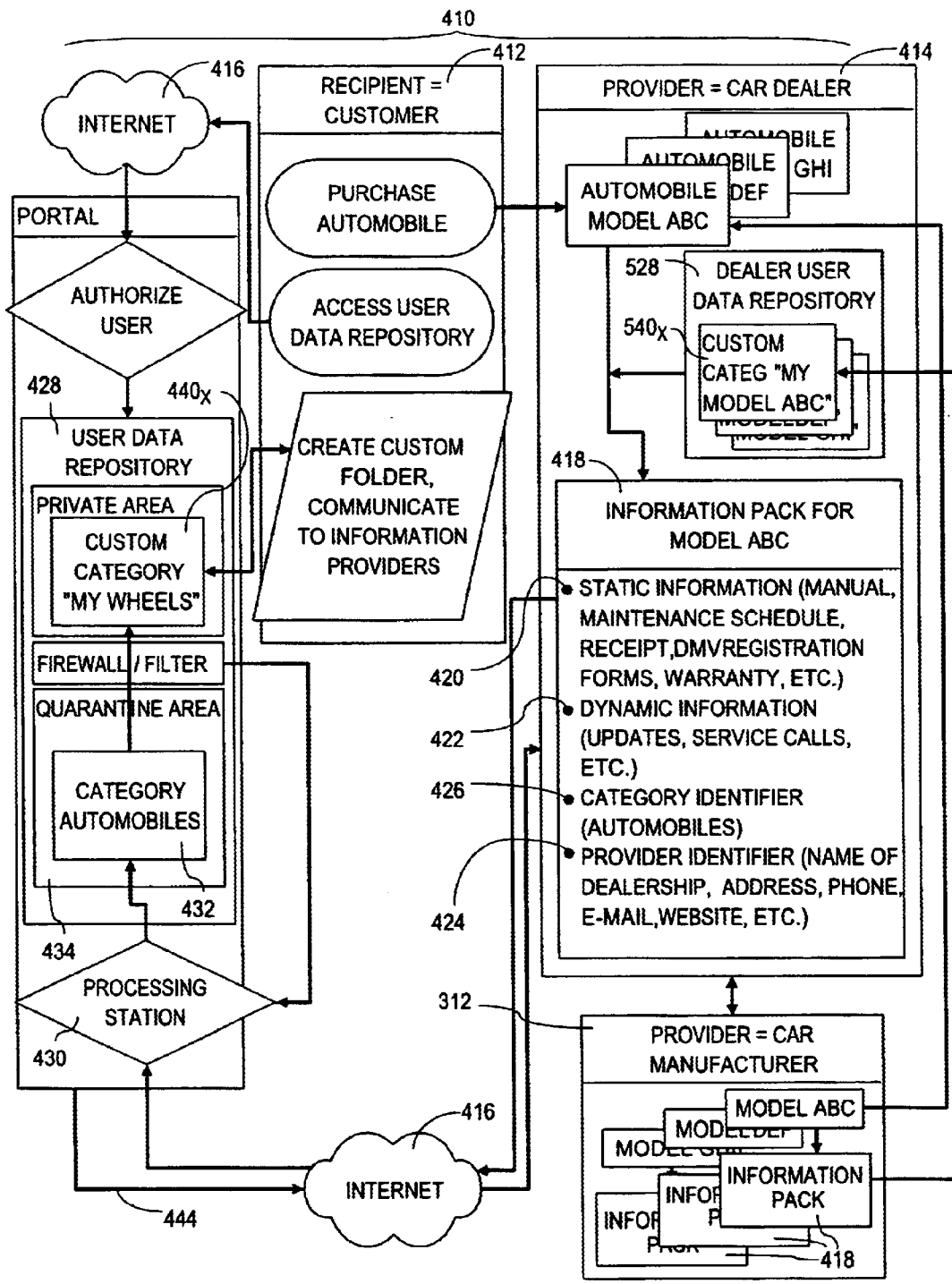
FIG. 5 is a schematic diagram of an example of the system and method of the present invention demonstrating its use as a hybrid of a business-to-business application and a consumer application, for the organization and management of information about an automobile supplied by the automobile manufacturer and the car dealer.

As shown in FIGS. 4 and 5, the systems 310, 410 can be effectively used with business-to-business transactions, and can be integrated with business-to-customer transactions, for seamless distribution of reliably organized information among suppliers, manufacturers, retailers, and customers. Turning first to FIG. 4, a car stereo supplier 314 sells to a car manufacturer 312 three models of CD players (Model 1, Model 2, and Model 3).

Suppose the car manufacturer 312 elects to install a "Model 1" CD player as a standard feature in an automobile model ABC. The car stereo supplier 314 prepares an Information Pack $318_A$ for the Model 1 CD player and incorporates information (Static Information $320_A$ and Dynamic Information $322_A$) for the Model 1 CD player into that Information Pack $318_A$. The Static Information $320_A$ could include technical features, documentation, installation instructions, financial arrangements, and wholesale price for use by the Car Manufacturer 312, as well as consumer documentation, warranty information, and user manual on the Model 1 CD player, and the like. The Dynamic Information $322_A$ could include ordering, shipping, account balance, sales programs, and engineering solutions information, and could be in the form of a link to the CD manufacturer's website, featuring advertising or promotions directed toward eventual purchasers of cars in which the Model 1 CD players are installed, and recall information concerning the Model 1 CD player.

Relevant portions of the Static Information $320_A$ and Dynamic Information $322_A$ of the CD manufacturer would later be fully integrated with Static Information 420 and Dynamic Information 422 (see FIG. 5) of the manufacturer 312, such that when a purchaser 412 of the model ABC automobile follows a dynamic information link provided in an Information Pack 418 relating to a purchased model ABC automobile, he or she will be able to see a link specifically to content, e.g. troubleshooting tips or reminders as to how to utilize features of the CD player, provided by the manufacturer of the Model 1 CD player, since the CD player is an integral component of the model ABC automobile.

Furthermore, the car manufacturer 312 has an option to communicate, via a reverse communication link 344, to the car stereo manufacturer 314 that a Model 1 CD player is being installed into the model ABC automobile. The system 310 is preferably configured such that this communication, i.e. by the car manufacturer 312 placing the Information Pack $318_A$ for the Model 1 CD player in a custom category location $340_X$ of the manufacturer's User Data Repository reserved for information concerning the "automobile model ABC," for example. The new custom category location $340_X$ of the Information Pack is communicated back to the car-stereo vendor utilizing the reverse communication link 344.

This communication allows the car stereo manufacturer 314 to know in how many models of automobiles this car manufacturer installs a "Model 1" CD player. The car stereo manufacturer 314 even has the option, if desired, to tailor supplements to the Information Pack $318_A$ for the Model 1 CD player for each model of automobile where it is installed, and the system 310 can be configured such that, by means of specific Category Identifiers 326, such supplements, if authorized by the car manufacturer 312, would automatically be delivered to the appropriate custom category locations 340 for the respective car models to which the supplements relate.

In short, the system 310 has the capability to treat the car manufacturer 312 as any other Recipient, with the car manufacturer's own User Destination Address and associated User Data Repository, for the purpose of receiving business-to-business Information Packs 318 from its vendors 314. Further, as shown in FIG. 5, the system 410, which can be fully integrated with the system 310, has the ability to treat the manufacturer 312 as a Provider of Information Packs to other Recipients, including the dealer.

In the dealer-to-customer transaction, a customer 412 who has a valid User Destination Address buys an automobile model ABC from a car dealer 414. Sometime during this purchase, the customer 412 provides his or her User Destination Address, which is encoded on the magnetic strip of his or her credit card, to the dealer 414. The dealer's point of sale and computer system preferably detects the User Destination Address while swiping the card through a credit card reader. Preferably, the dealer 414 is registered with a registrar or overseer of the system 410, and complies with the accepted protocol of the system 410.

Sometime before this car purchasing transaction, the dealer 414 received an Information Pack 418 from the manufacturer for each model of automobiles that is sold in the dealership. These same Information Packs 418 are then manipulated by the dealer (as is explained in greater detail below), or alternatively, new Information Packs may be generated by the dealer, before being sent to a User Data Repository 428 associated with the User Destination Address of the Customer 412.

A majority the Static Information 420 and Dynamic Information 422 content of the Information Packs 418 is provided by the car manufacturer, such as car manuals, warranty information, maintenance schedules, vehicle owner registration forms, accessories catalogs, and the like. A generic Category Identifier 426, such as "automobiles", is appended to the Information Pack 418 by categorization means performed either by the car manufacturer, or by a Processing Station 430 that recognizes the Provider Identifier 424 of the car manufacturer (or the car dealer) as corresponding to the generic category "automobiles," and automatically appends the appropriate Category Identifier 424 to the Information Pack 418.

Additionally, the manufacturer 312 incorporates into the Information Pack 418 portions of the Static Information $320_A$ and Dynamic Information $322_A$ contents of Information Packs $318_A$ from the component vendors, such as the Model 1 CD Player, the tires, the cellular telephone, and so on. The Static Information 420 component is essentially a set documents that a customer 412 receives with a purchase of an automobile preferably only in an electronic format. The Dynamic Information 422 component is preferably a web address link, also referred to herein as an information link, to an Internet website where the manufacturer maintains and updates information relevant only for the specific model of car, and as described above, can include integral links to information from the car manufacturer's various relevant vendors, such as from the car stereo manufacturer 314.

Considering now the manipulation of the Information Pack 418 in greater detail, the dealer 414 receives the Information Pack 418 for the ABC model of automobile from the car manufacturer 312 when the Information Pack 418 is delivered to the dealer's User Data Repository 528. As indicated by broken lines of the drawing, some details of the communication of the Information Pack 418 from the car manufacturer 312 to the User Data Repository 528 of the car dealer 414 have been omitted for clarity, and to avoid repetition. The car dealer 414 creates a custom category location 540X entitled "My ABC model" (for example) and either adds on to this Information Pack 418, or generates a new Information Pack 418 incorporating relevant Static Information 420 and Dynamic Information 422 from the manufacturer and the dealership, such as services offered for this particular model of the automobile, sales receipt, financing balance, DMV registration, and applied promotions.

Advantageously, the dealer has an option, or at least the capability, to communicate the custom category location $540_X$ back to the car manufacturer and allow the manufacturer and all other subsequent vendors to maintain relevant portions of the Information Pack 418. The dealer's name is preferably substituted into (or appended to) the Information Pack 418 as the Provider Identifier 424, in place of (or in addition to) the manufacturer's name, which was previously associated with the Information Pack 418 as the Provider Identifier when the manufacturer 312 sent the Information Pack 418 to the User Data Repository 528 associated with the dealer's User Destination Address.

Upon purchase of an automobile, the dealer's computer system automatically sends the modified or newly generated Information Pack 418 to the purchaser's User Data Repository 428, using the purchaser's User Destination Address. A Processing Station 430 analyzes the Provider Identifier 424 and, so long as there is not a block established by the purchaser 412 to prevent Information Packs from the dealer 414, the Processing Station 430 authorizes the Information Pack 418 to be delivered Quarantine Area 434 of the User Data Repository 428, in a location 432 reserved for information corresponding to the appropriate category, namely "automobiles," as provided by the Category Identifier 426.

If a Category Identifier 426 has not already been associated with the Information Pack 418 provided by the dealer, then in the manner described above, the Processing Station 430 can be configured to recognize the dealer's name in the Provider Identifier 424 and append an appropriate generic Category Identifier 426 to the Information Pack 418.

The next time that the purchaser 412 accesses his or her User Data Repository 428 using the Internet 416 or some other User Data Repository access means, a new message associated with "automobile" category appears on the screen, or is otherwise communicated to the purchaser. The Provider Identifier 424 allows the User 412 to quickly evaluate the Information Pack 418 and make a decision about what to do with its contents. Options may include assigning a custom category location $440_X$, such as "my new wheels" for the Information Pack, forwarding the Information Pack 418 to another person's User Destination Address, discarding the Information Pack 418, and establishing a block to prevent all future Information Packs from the particular provider 414. Of course, this list is not exclusive.

The Processing Station 430 can receive a signal when there is a placement by the purchaser 412 of an Information Pack 418 into a Customized Category, and thereafter append a Customized Category Identifier (not shown) to subsequent Information Packs from the same dealer or provider, so that the Information Pack can be placed into the purchaser's User Data Repository 428 in the custom category location $440_X$ that purchaser has already customized as a preferred location for all information packs from that particular Provider, namely the dealer (for example, "my new wheels"). This advantageously allows the purchaser to passively locate all subsequent maintenance records for that particular ABC automobile in the customized location for the automobile. Also, if the dealer wanted to send a reminder that the car is due for a maintenance visit, the dealer would simply send a new Information Pack and the Processing Station would automatically place the reminder in the Customized Location.

In this example, the purchaser creates a new folder "my new wheels" in the private area, allows direct passage through the Firewall/Filter for any future Information Packs from this particular provider (dealer), and deposits the Information Pack 18 into the new "my new wheels" location. The placement of the Information Pack can advantageously cause a signal to be sent, such as an e-mail message, announcing this action and containing the Custom Category Identifier of the new posted Information Pack 18. From the purchaser's perspective, all necessary and relevant to the new information is available in that custom location and is easily accessible. Additionally, the purchaser will have a direct communication link, via the reverse communication link 444, to the car dealer 414, as well as to the car manufacturer 312 and the car manufacturer's vendors 314.

From the perspective of the car manufacturer 312, this reverse communication link 444 provides a link with the owner of an ABC model purchased from the particular dealer, and it is up to the purchaser to optionally disclose any additional information to the manufacturer. However, important information from the manufacturer 312, such as recall notices, can reliably reach an appropriate location within the purchaser's User Data Repository 428.

If necessary, the recall notices can travel in Information Packs sent first to the dealer, so that in case proper placement in Customized Locations in the purchaser's User Data Repository is based on the Provider Identifier, the recall notice will still come from the appropriate Provider and be assigned the correct Custom Category Identifier. Alternative means for assuring proper placement are within the scope of the present invention, such as appending multiple Provider Identifiers to a given Information Pack, so that subsequent Information Packs from any one of the Providers will be recognized and placed in the same proper Custom Category Location $440_X$.

EXAMPLE 4

Figure 6:
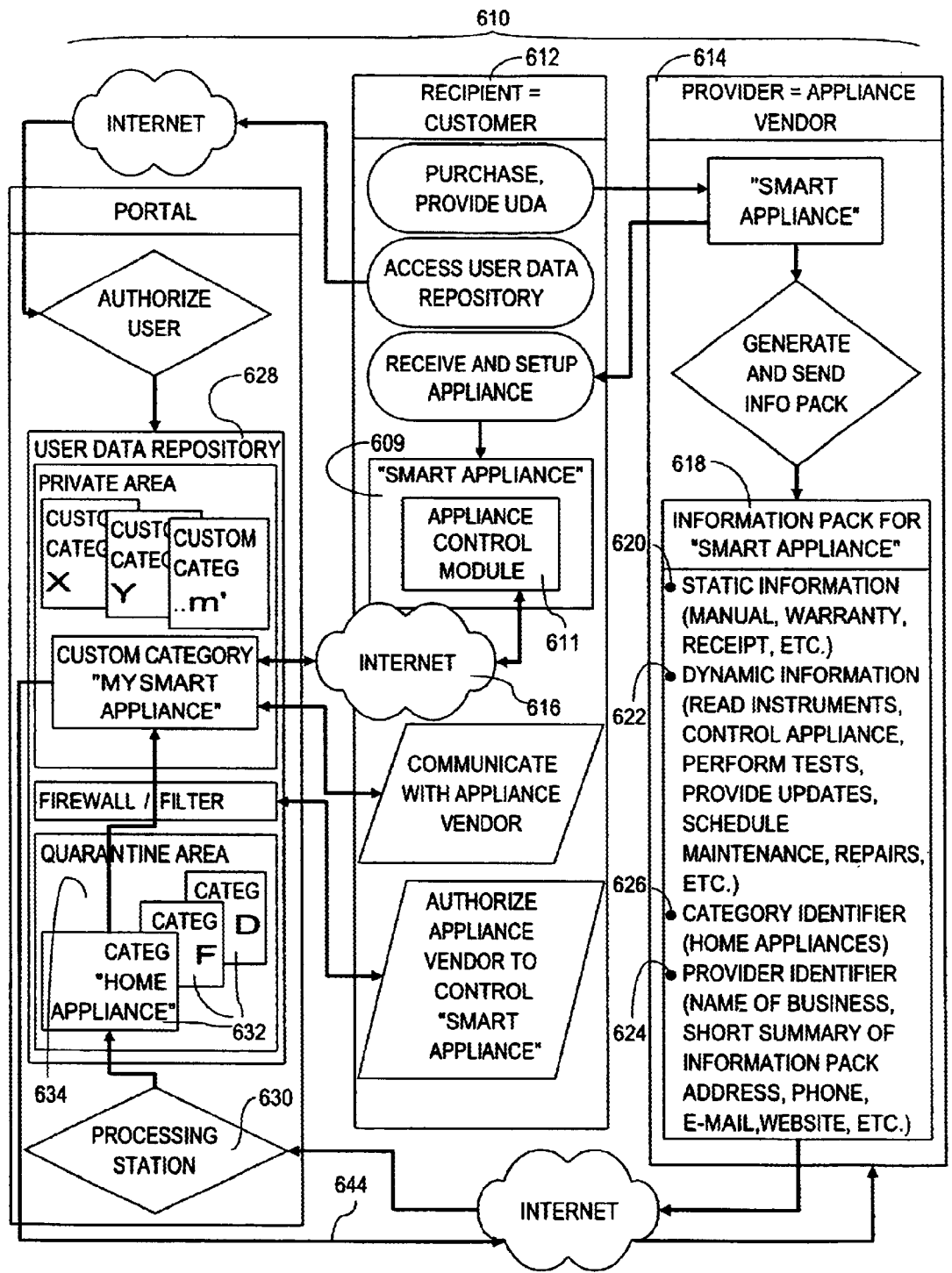
FIG. 6 is a schematic diagram of an example of the system and method of the present invention demonstrating its use for the organization and management of information relating to the remote control of externally controllable home appliances.

As demonstrated in FIG. 6, one format that the Static Information 620 and/or the Dynamic Information 622 can take is that of executable computer files, for example diagnostic computer programs. A provider, such as an Appliance Vendor 614 can, if desired by a Recipient 612, send diagnostic programs and maintenance programs for so-called "smart appliances" 609 as part of an Information Pack 618, and using the Category Identifier 626, the diagnostic programs can be sent automatically to locations of the Recipient's User Data Repository 628 that correspond with that category.

The Information Pack 618 is preferably analyzed at a processing station 630 remote from the User Data Repository, where certain authorization tasks may be performed. These authorization tasks may include verifying the format of the Information Pack 618, verifying the Appliance Vendor 614 as being an authorized provider of information packs by analyzing the Provider Identifier 624 and comparing it to a list of authorized providers stored in a data storage portion of the Processing Station 630, and identifying the appropriate category to which the information in the Information Pack 618 relates by analyzing the Category Identifier 626 to determine the proper Category location 632 in the Quarantine Area 634 of the User Data Repository 628 in which to place the Information Pack 618.

In this example, it is envisioned that the Recipient's "smart appliance" 609 has an appliance control module 611, which is in communication with the User Data Repository 628 by such communication means as the Internet 616, an intranet, or direct cable connection. The diagnostic programs and maintenance programs can be sent to the User Data Repository 628 using the user destination address provided at the time of purchase, communicate with the appliance control module 611 by the communication means, and advantageously perform appropriate functions on the smart appliance 609 without any action on the part of the Recipient 612. Additional smart appliances (not shown) can communicate with the programs received in the User Data Repository 628 in a similar manner, such that an entire household of appliances can be remotely diagnosed and maintained by a single appliance vendor 614.

Advantageously, the reverse communication link 644 is established upon delivery of the Information Pack 614 to the User Data Repository 628. The reverse communication link 644 sends, for example, data from the diagnostic programs, or from the appliance control module 611 within the smart appliance 609, back to the Provider 614. This transmission of data regarding the customer's smart appliance 609 allows the Appliance Vendor 614 to easily assess performance of individual appliances, detect problems, and if need be, contact the customer 612 to schedule a convenient appointment for repairs.

While the present invention has been disclosed with respect to certain preferred embodiments and particular examples, it is not intended to be limited thereto. It is recognized that many variations and equivalents are possible, and are intended to be within the scope of the appended claims.

I claim:

1. A system for providing information to one or more users, said system comprising:

means for each of said one or more users to provide to one or more information providers a user destination address associated with at least one of said users;

categorizing means for each of said one or more information providers to associate with information to be provided to said one or more users an identification of a category to which said information relates;

means for said information provider to send said information to at least one of a multiplicity of user data repositories, each of said user data repositories being associated with at least one of said users, and said means for sending information including utilizing said user destination address to communicate said information to the user data repository associated with at least one of said users;

wherein said information is stored in an information pack while being transmitted from said provider to one of said multiplicity of user data repositories, further comprising identification means for associating a provider identifier with said information pack prior to delivery of said information pack to any of said multiplicity of user data repositories;

wherein after said information pack is received in said user data repository, an authorization means allows the user to review said provider identifier associated with the information pack and to selectively permit the information pack to remain in the user data repository or reject the information pack;

wherein in the event said user rejects said information pack, said information pack is automatically removed from the user data repository associated with said user;

wherein upon said user rejecting said information pack from said provider, a blocking means automatically prevents further information packs from said provider from reaching the user data repository of said user;

wherein said blocking means comprises, upon said user rejecting said information pack, communicating a rejection signal from said user data repository to a processing station between said provider and said multiplicity of user data repositories, said processing station including a data storage means and a data processing means, said data storage means storing provider identifiers for which rejection signals have been received and further storing, together with each of said provider identifiers for which rejection signals have been received, each of the user destination addresses associated with the user data repositories from which said rejection signals have been communicated, and said processing means analyzing the provider identifier and user destination address associated with each information pack sent from said provider and comparing said provider identifier and said user destination address to the provider identifiers and the user destination addresses stored in said storage means each time said information pack is sent from said provider to one of said multiplicity of user data repositories, and in the event of a match of said provider identifier and user destination address associated with the information pack and one of said provider identifiers and said user destination addresses stored together in said storage means, preventing said information pack from being communicated to said user destination address associated with the information pack;

means for determining with which category said information has been identified by said categorization means; and means for placing said information in a location within the user data repository of said user reserved for information of the identified category, whereby said information is automatically stored in said location within the user data repository reserved for information of the identified category.

2. A system for providing information to one or more users, said system comprising:

means for each of said one or more users to provide to one or more information providers a user destination address associated with at least one of said users;

categorizing means for each of said one or more information providers to associate with information to be provided to said one or more users an identification of a category to which said information relates;

means for said information provider to send said information to at least one of a multiplicity of user data repositories, each of said user data repositories being associated with at least one of said users, and said means for sending information including utilizing said user destination address to communicate said information to the user data repository associated with at least one of said users;

wherein said information is stored in an information pack while being transmitted from said provider to one of said multiplicity of user data repositories, further comprising identification means for associating a provider identifier with said information pack prior to delivery of said information pack to any of said multiplicity of user data repositories;

wherein after said information pack is received in said user data repository, an authorization means allows the user to review said provider identifier associated with the information pack and to selectively permit the information pack to remain in the user data repository or reject the information pack;

wherein in the event said user rejects said information pack, said information pack is automatically removed from the user data repository associated with said user;

wherein upon said user rejecting said information pack from said provider, a blocking means automatically prevents further information packs from said provider from reaching the user data repository of said user;

wherein said blocking means comprises, upon said user rejecting said information pack, communicating a rejection signal from said user data repository to a processing station associated with said provider, said processing station including a data storage means and a data processing means, said data storage means storing each of the user destination addresses associated with the user data repositories from which said rejection signals have been communicated, and said data processing means analyzing the user destination address associated with each information pack sent from said provider and comparing said user destination address to each user destination addresses stored in said storage means each time said information pack is sent from said provider to one of said multiplicity of user data repositories, and in the event of a match of said user destination address associated with the information pack and one of said user destination addresses stored in said storage means, preventing said information pack from being communicated to said user destination address associated with the information pack;

means for determining with which category said information has been identified by said categorization means; and means for placing said information in a location within the user data repository of said user reserved for information of the identified category, whereby said information is automatically stored in said location within the user data repository reserved for information of the identified category.

3. A system for providing information to one or more users, said system comprising:

means for each of said one or more users to provide to one or more information providers a user destination address associated with at least one of said users;

categorizing means for each of said one or more information providers to associate with information to be provided to said one or more users an identification of a category to which said information relates;

means for said information provider to send said information to at least one of a multiplicity of user data repositories, each of said user data repositories being associated with at least one of said users, and said means for sending information including utilizing said user destination address to communicate said information to the user data repository associated with at least one of said users;

wherein said information is stored in an information pack while being transmitted from said provider to one of said multiplicity of user data repositories, further comprising identification means for associating a provider identifier with said information pack prior to delivery of said information pack to any of said multiplicity of user data repositories;

wherein after said information pack is received in said user data repository, an authorization means allows the user to review said provider identifier associated with the information pack and to selectively permit the information pack to remain in the user data repository or reject the information pack;

wherein in the event said user rejects said information pack, said information pack is automatically removed from the user data repository associated with said user;

wherein upon said user rejecting said information pack from said provider, a blocking means automatically prevents further information packs from said provider from reaching the user data repository of said user;

wherein said blocking means comprises, upon said user rejecting said information pack, storing said provider identifier in a storage means of a processing station associated with said user destination address of the user, said processing station further including a data processing means, said data storage means storing each of the provider identifiers associated with the information packs which said user rejects, and prior to said information pack being communicated to the user data repository associated with said user destination address, said data processing means analyzing the provider identifier associated with each information pack received by the user destination address from said provider and comparing said provider identifier to each of the provider identifiers stored in said storage means, and in the event of a match of said provider identifier associated with the information pack and one of said provider identifiers stored in said storage means, preventing said information pack from being communicated to said user data repository associated with the user destination address;

means for determining with which category said information has been identified by said categorization means; and means for placing said information in a location within the user data repository of said user reserved for information of the identified category, whereby said information is automatically stored in said location within the user data repository reserved for information of the identified category.

4. A method for providing information to one or more users of a system comprising the steps of:

storing information to be provided in an information pack;

associating with said information pack at least a user destination address associated with one of a multiplicity of user data repositories each of said user data repositories associated with at least one of said users and a category identifier;

associating with said information pack a provider identifier;

communicating said information pack by means of a network to said user data repository associated with the user destination address;

locating said information pack in a location of said user data repository associated with the user destination address reserved for information corresponding to a category to which said category identifier corresponds; and further comprising, after said step of communicating the information pack to said user data repository associated with the user destination address, the steps of:
  creating a custom location in said user data repository;
  placing said information pack in said custom location;
  associating a custom category identifier with said information pack;
  sending a custom category signal to a processing station uniquely associated with said user data repository including a data storage means and a data processing means, said data storage means storing together said custom category identifier and said provider identifier, and said data processing means analyzing the provider identifier of subsequent of said information packs, comparing said provider identifier of said subsequent information packs with said provider identifier stored in said storage means and in the event of a match between the provider identifier of one of said subsequent information packs and the provider identifier stored in said storage means, placing said one of the subsequent information packs in said custom location.

5. A method for providing information to one or more users of a system comprising the steps of:

storing information to be provided in an information pack;

associating with said information pack at least a user destination address associated with one of a multiplicity of user data repositories, each of said user data repositories associated with at least one of said users, and a category identifier;

associating with said information pack a provider identifier;

communicating said information pack by means of a network to said user data repository associated with the user destination address;

locating said information pack in a location of said user data repository associated with the user destination address reserved for information corresponding to a category to which said category identifier corresponds; and further comprising, after said step of communicating the information pack to said user data repository associated with the user destination address, the steps of:
  creating a custom location in said user data repository;
  placing said information pack in said custom location;
  associating a custom category identifier with said information pack;
  sending a custom category signal to a processing station associated with all of said multiplicity of user data repositories including a data storage means and a data processing means, said data storage means storing together said user destination address, said custom category identifier and said provider identifier, and said data processing means analyzing the user destination address and provider identifier of subsequent of said information packs, comparing said user destination address and provider identifier of said subsequent information packs with said provider identifier and user destination address stored in said storage means and in the event of a match between both the provider identifier and user destination address of one of said subsequent information packs and both the provider identifier and user destination address stored in said storage means, placing said one of the subsequent information packs in said custom location of the user data repository associated with said user destination address.

* * * * *

UNITED STATES PATENT AND TRADEMARK OFFICE
CERTIFICATE OF CORRECTION

PATENT NO. : 6,651,063 B2
DATED : November 18, 2003
INVENTOR(S) : Andrei G. Vorobiev It is certified that error appears in the above-identified patent and that said Letters Patent is hereby corrected as shown below:

Column 24,
Line 15, replace "repositories" with -- repositories, --
Line 17, replace "users" with -- users, --

Signed and Sealed this

Third Day of February, 2004

JON W. DUDAS
*Acting Director of the United States Patent and Trademark Office*